United States Patent

[11] 3,569,788

| [72] | Inventor | Dennis L. Niblack |
| | | 4860 E. 18th Ave., Denver, Colo. 80220 |
| [21] | Appl. No. | 811,419 |
| [22] | Filed | Mar. 28, 1969 |
| [45] | Patented | Mar. 9, 1971 |

[54] MULTIPLE FUNCTION CONTROL DEVICE FOR CONTROLLING EMERGENCY EQUIPMENT IN MOTOR DRIVEN VEHICLES
7 Claims, 10 Drawing Figs.

[52] U.S. Cl. .................................................. 317/101, 317/99, 325/353
[51] Int. Cl. .................................................. H02b 1/04
[50] Field of Search .......................................... 325/312, 252, 256; 317/101, 99, 101 (C), 101 (CB), 120

[56] References Cited
UNITED STATES PATENTS
| 2,175,025 | 10/1939 | Hooven | 325/353 |
| 2,731,555 | 1/1956 | Beck | 325/353x |
| 2,855,454 | 10/1958 | Alden | 317/101CB(UX) |
| 3,048,747 | 8/1962 | Errichiello | 317/101CB(UX) |
| 3,482,147 | 12/1969 | Kersten | 317/101CB(UX) |

*Primary Examiner*—David Smith, Jr.
*Attorney*—Bertha L. MacGregor

ABSTRACT: A multiple-function control device for installation in emergency vehicles for controlling special lights, sirens, radio communications equipment, radio teletype equipment, horns, bells and other alerting devices, comprising a compact control unit accessible to the operator of the vehicle and a separate adapter unit, both removably mounted in a portable housing. The adapter serves as a universal separable connector between the control unit and the various emergency equipment controlled thereby and permits alternations, substitutions and replacements of the emergency equipment by quick plug-in connection to the adapter. The control means may be altered to meet the requirements of the emergency equipment without disturbing the adapter unit.

PATENTED MAR 9 1971 3,569,788

INVENTOR.
Dennis L. Niblack
BY Bertha L. MacGregor
ATTORNEY

INVENTOR.
Dennis L. Niblack
BY
Bertha L. MacGregor
ATTORNEY

INVENTOR.
Dennis L. Niblack

MULTIPLE FUNCTION CONTROL DEVICE FOR CONTROLLING EMERGENCY EQUIPMENT IN MOTOR DRIVEN VEHICLES

This invention relates to a multiple-function control device for installation in emergency vehicles of all kinds, such as police, fire, highway maintenance, ambulance, doctors and other public safety type vehicles, for the purpose of controlling special lights, sirens, radio communications equipment, radio teletype equipment, horns, bells and other alerting devices.

The main object of the invention is to produce a self-contained portable control device which consists of a multiple-function control panel with electrical components and wiring assembled in a unitary structure, an adapter unit, and means detachably connecting the two units, all removably encased in a portable housing which can be mounted in a vehicle for easy access and reading by the operator of the vehicle.

Another object of the invention is to produce a multiple-function control device of the character described which is very compact, in which the control means are quickly identifiable by their form, color and arrangement to perform the functions for which they are designed.

Another object is to provide a self-contained adapter assembly, slidably mounted in the control device housing, comprising all the electrical components, interfacing of wiring or cabling, adjustments and plug receptacles necessary to interface or interconnect all of the controls and all of the equipment necessary to the operation of the emergency vehicle.

Emergency vehicles now in use are for the most part vehicles produced by conventional motor car manufacturers and are not predesigned for receiving installation of special lights, sirens, radio communications equipment, radio teletype equipment, horns, bells and other alerting devices essential to the operation of police, fire and other emergency vehicles. Thus, heretofore, the various parts of this special equipment and their controls have been installed in different locations in different makes of vehicles, either by the vehicle manufacturer or the purchaser, each functional assembly being individually wired to its control and each control being placed in some available place, resulting in nonuniformity of location, nonuniformity of the control devices as to form, color and arrangement for each function, as well as expensive and inefficient use of wiring between each control and the mechanism to be controlled thereby.

The devices to be controlled are usually selected by the vehicle owner to perform the functions he desires, and the controls must be available for this purpose. In many cases, new emergency equipment (not integral part of the vehicle) is purchased when a new vehicle is purchased. In some cases, emergency equipment is moved from one vehicle to another, or some old equipment is used and some new equipment is added. This creates a problem in fitting the emergency equipment to the control means. The adapter of my invention is a simple and efficient device that combines the control function with the mechanisms to be controlled. By providing for interconnection of all functions which may be required, such as outside light connections, outside siren controls, inside lighting functions, outside speaker controls, inside or outside radio controls, my adapter is efficient for utilization of the equipment of different manufacturers, different voltages or current consumption, varying locations of the mechanisms to be controlled, and various configurations of control equipment and installations.

The retrofitting of conventional vehicles with emergency equipment and prior art control means therefor is costly and time consuming, and the installation requires drilling of many holes and openings to accommodate fastening means and wiring. This renders the vehicle unacceptable and reduces its resale value. Further, controls for similar functions in prior art equipment are nonuniform in appearance resulting in added burden to the operator of the vehicle who is obliged to familiarize himself with different controls. Further, due to the excess space required for controls individually installed, the controls are often out of reach of the operator and difficult to read. The equipment is not readily removable or replaceable due to the separate wiring systems now employed between the separate controls and the assemblies they are intended to control.

This invention is designed to overcome the objections existing in prior art installations and to produce the advantages resulting from preassembly, in a readily accessible portable housing, of improved control devices, compactly constructed, coupled with an adapter unit which provides interchangeable connections and interfacing means between the control devices and the various communications and lighting assemblies controlled thereby which may be located in the trunk of other remote part of the vehicle.

Figure 1:
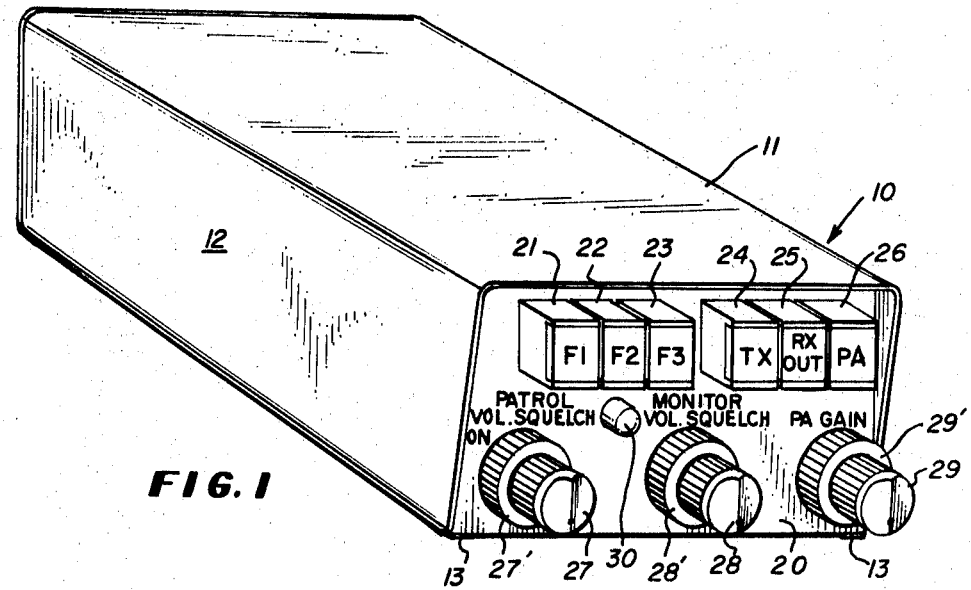
FIG. 1 is a perspective view of a multiple-function control device embodying my invention, showing the control panel and the housing which encloses two separable units, namely, the unit that comprises the control panel and its components and wiring, and the adapter unit.
Figure 2:
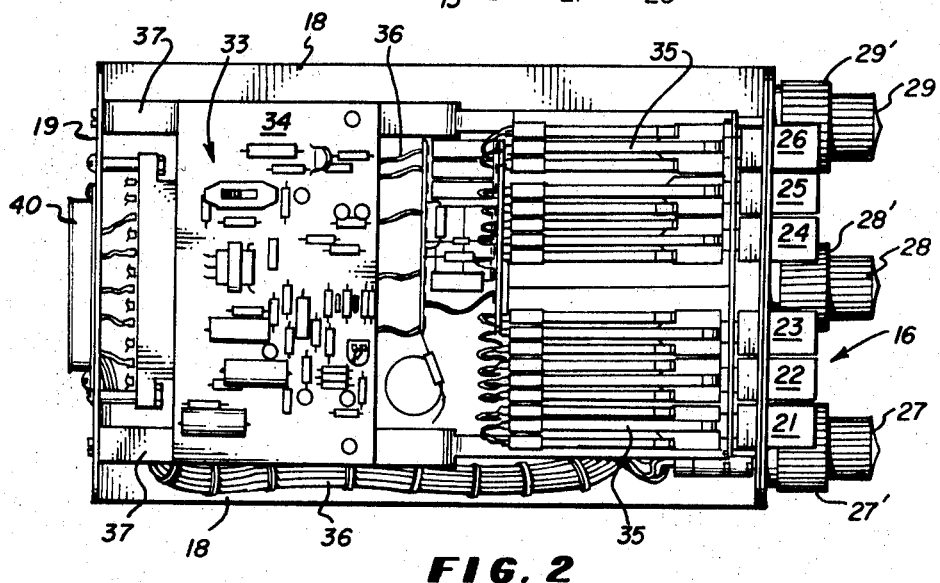
FIG. 2 is a top plan view of the control unit removed from its housing.
Figure 3:
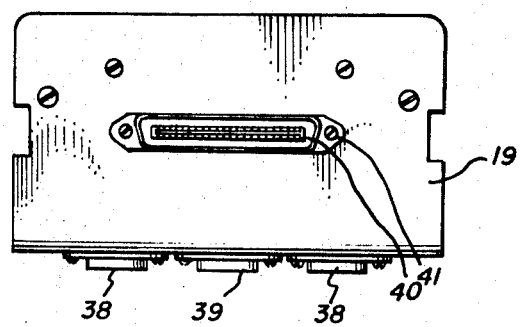
FIG. 3 is an elevational rear view of the control unit as shown in FIG. 2.
Figure 4:
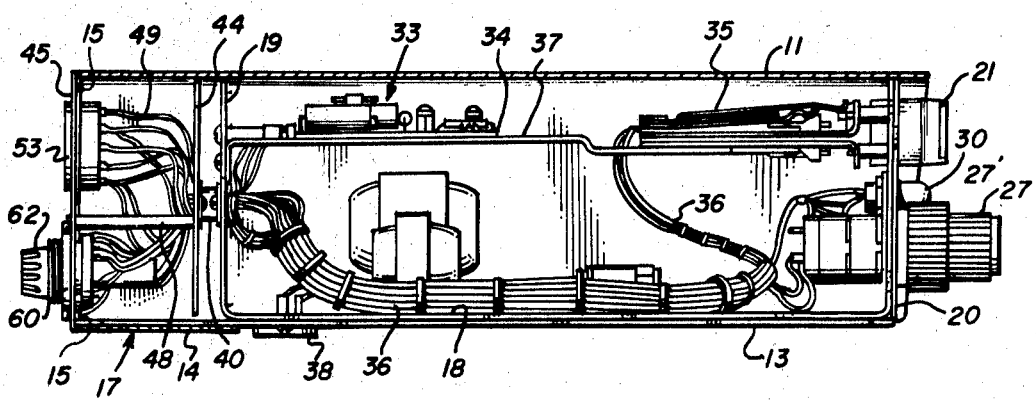
FIG. 4 is an elevational side view of the control device, including the control and adapter units and their housing which is shown in vertical section.
Figure 5:
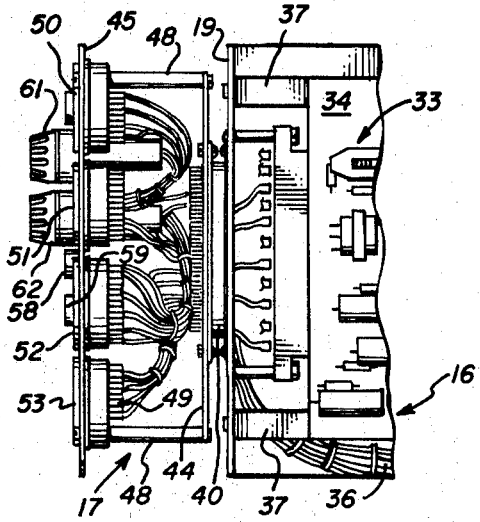
FIG. 5 is a top plan view of the adapter unit and part of the control unit, operatively connected together by the means which detachably connect the two units; the housing being omitted.
Figure 6:
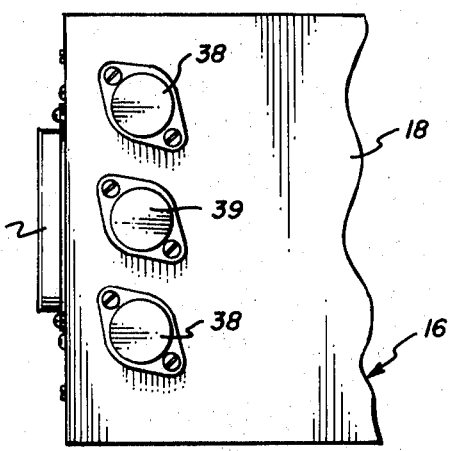
FIG. 6 is a bottom view of the rear portion of the control unit.
Figure 7:
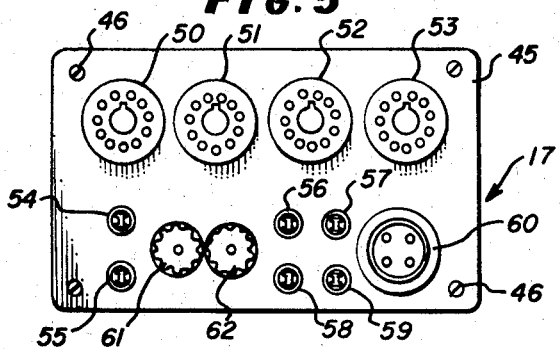
FIG. 7 is an elevational rear view of the adapter unit.

In that embodiment of the invention shown in the drawings, a housing indicated as a whole at 10 comprises a top 11, sidewalls 12, and a partial bottom which consists of horizontal longitudinal side flanges 13 and a crosspiece 14 adjacent the rear end of the housing. The top 11, sides 12 and flanges 13 preferably are formed integrally; the front and rear ends are open. Mounting strips 15 are fastened to the inner surfaces of the sidewalls 12 adjacent the open rear end of the housing 10 to provide means for fastening an adapter unit in the housing.

The control unit as a whole is designated 16 and the adapter unit as a whole 17. The unit 16 is insertable into the housing 10 through its open front end and slidable on the flanges 13 until stopped by contact of the rear end of the control unit 16 with the transverse edge of the bottom crosspiece 14. The latter underlies the bottom of the adapter unit 17 when the unit has been inserted into the open rear end of the housing 10. The control unit 16 comprises a bottom plate 18, a rear vertical end wall 19 and a front vertical panel 20 which may be integrally formed. Control buttons and knobs, which vary according to the requirements of the emergency equipment in the vehicle, are mounted on the panel 20.

In the embodiment of the invention shown in FIGS. 1—4, six switch buttons are provided. Buttons 21, 22, 23 are marked F1, F2 and F3, respectively, to indicate frequencies. Switch button 24 is marked TX for transmitter, button 25 RX Out for amplifier-receiver, and button 26 PA for public address. Double function rotating knobs are designated 27, 27', 28, 28' and 29, 29'. The radio controls 21, 22, 23, provide for control of a three frequency transmit or receive two-way mobile radio unit. Knob 27 controls an on-off switch and also serves for volume control. Knob 27' serves for squelch control; knob 28 for volume control and 28' for squelch control of a single frequency monitor receiver in addition to the mobile transmitter receiver. Knob 29 serves for gain control. The lamp 30 is a transmitter monitor lamp. These are the controls required for a combination mobile radio control head, electronic siren and public address system, which have been integrated into a compact console for operator convenience and are described herein as one example of the multiple-function control device embodying my invention.

Figure 10:
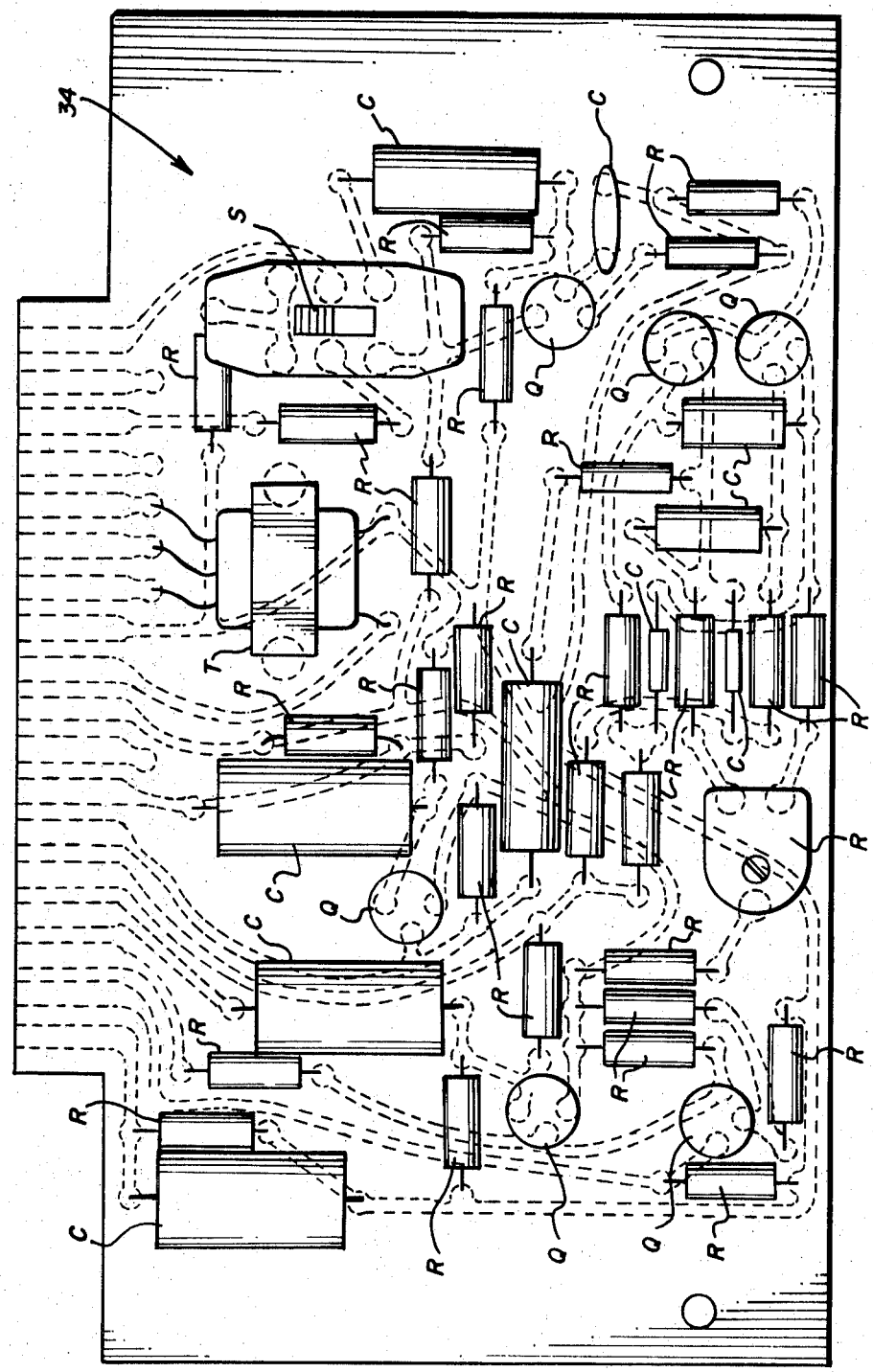
FIG. 10 is a diagrammatic view of the components and wiring which are part of the control unit shown in FIG. 2.

The various control means are wired to appropriate electronic components 33, shown diagrammatically in FIG. 10, identified by letters R for resistors, T for transformers, C for condensers/capacitors, Q for transistors, and S for a switch. The components vary according to the particular control means for controlling the emergency equipment selected by the owner of the vehicle. The components 33 are mounted on a board 34 and are connected through connectors 35 to wiring 36. The component board 34 and the connectors 35 are mounted on a frame member 37. Two power amplifier transistors 38 and a driver stage transistor 39 are mounted on the bottom 18 of the unit 16. A shield for covering the parts 38 and 39 has been omitted.

All the wiring from the control means 21—30 on front panel 20, as well as the wiring 36, is connected to a rack-to-panel connector 40 mounted by screws 41 on the rear end wall 19 of the control unit. The connector 40 cooperates with a complemental connector on the adapter unit 17 which will be described following a brief description of the operation of the control unit 16.

In the embodiment chosen to illustrate my invention, the electronic siren-public address system portion of the mobile communications control unit consists of three basic circuits: siren oscillator and control circuit, microphone preamplifier stage, and a three stage power amplifier. A separate warning equipment control console (not shown) for controlling electronic siren functions, i.e., manual and automatic siren selection, can be connected to the mobile communications control console shown herein with pin type connectors.

The public address function switch 26 provides control of the electronic siren-public address portion of the control unit. The transmitter TX switch button 24 when depressed enables the siren oscillator circuit and disables all public address functions by resetting switches 25 and 26. Resetting switch 26 enables the microphone audio and push-to-talk circuits such that operation of the microphone switch keys and delivers microphone audio to the mobile transmitter. Switch 24 enables the siren oscillator by suitable connections so that the siren oscillator may be remotely keyed.

The RX Out switch 25 when operated disables the siren oscillator by resetting switch 24 and enables the PA amplifier by suitable connections to the PA gain control 26. Mobile receiver audio output is paralleled from the mobile receiver speaker to the primary of a transmitter through matching resistors and input level controls which are part of the components shown in FIGS. 2 and 10. Mobile receiver audio output is coupled to the power amplifier, amplified and delivered to the outside speaker. The two way mobile transmitter remains fully operational in the RX Out function.

The public address switch 26 operated disables the siren oscillator by resetting switch 24 and enables PA amplifier by switching the microphone audio to the PA amplifier gain control 29 and disabling the two-way mobile push-to-talk circuit. Microphone audio is then amplified by the power amplifier and delivered to the outside speaker. The two-way mobile transmitter is disabled in the PA function.

Figure 8:
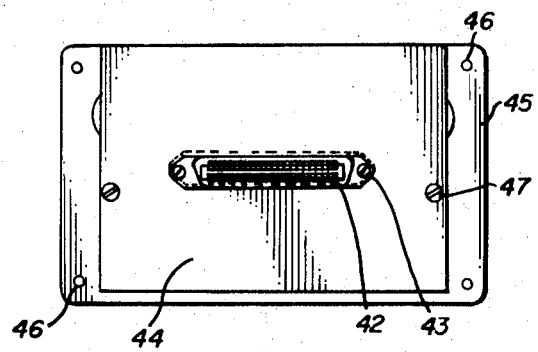
FIG. 8 is an elevational view of that surface of the adapter unit which faces the rear of the control unit when the two units are positioned in their housing.
Figure 9:
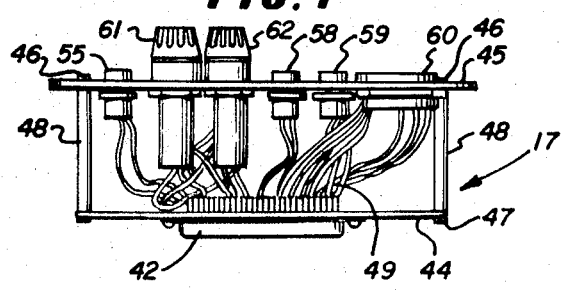
FIG. 9 is a bottom view of the adapter unit detached from the control unit.

A special feature of my invention is the adapter unit 17 which is designed to provide all needed connections between the control unit 16 (and modifications thereof as dictated by the emergency equipment in the vehicle) and the apparatus to be controlled. The adapter 17 comprises a rack-to-panel connector 42 which is complemental to the connector 40 on the rear end wall 19 of the control unit 16. The connector 42 is mounted by screws 43 on the inner wall 44 which faces the control unit when the units 16 and 17 are positioned as intended in the housing 10. The mating of the two connectors, 40 and 42, provides separable connections between the wiring in the unit 16 and the wiring in the adapter 17. The inner end wall 44 of the adapter is smaller in are than the outer wall 45, as shown in FIG. 8, so that the adapter unit 17 can be slipped into the rear end of the housing 10, whereupon the end wall 45 abuts the edges of the housing walls 11, 12, 14, and is fastened by screws 46 to the strips 15 attached to the sidewalls 12 of the housing 10. The connector 42 has limited movement relatively to the wall 44 on which it is mounted to facilitate engagement between the cooperating parts 40, 42 mounted, respectively, on the control unit and adapter.

The inner wall 44 and outer wall 45 of the adapter are connected together in spaced-apart relationship by screws 47 which extend into tubular spacers 48 between the two walls. All the wiring of the control means of unit 16, terminating in the rack-to-panel connector 40, make contact through connector 42 with wiring 49 connected to the connector part 42 in the adapter between the walls 44 and 45. The free ends of the wires 49 are connected to a variety of sockets and receptacles mounted on the exposed outer wall 45 of the adapter. The sockets and receptacles of the adapter are chosen to accommodate plugs which are part of the emergency equipment to be controlled by the unit 16. The capacity of the sockets and receptacles for receiving plugs is greater than may be required for most installations, which makes the adapter useful and efficient for all its initially intended functions as well as additions thereto. Multipin sockets 50, 51, 52, 53, receptacles 54, 55, for public address and siren speaker plugs (not shown) and receptacles 56, 57, 58, 59, for feed speaker plugs (not shown) are ample to accommodate a wide variety of emergency equipment. Socket 60 is provided to receive a microphone plug (not shown). Fuses 61 and 62 are provided. The sockets and receptacles of the adapter are adapted to receive the plugs of any emergency equipment which may be located in the trunk or other remote part of the vehicle.

The adapter serves as a universal connector between variable control means, mounted in a structure such as the unit 16, and the variable emergency equipment located in different locations in the vehicle. When alterations are required in the emergency equipment, the disconnection from the adapter sockets and receptacles such as parts 50—60 herein described can be quickly and easily achieved, and new emergency equipment can be readily installed and connected to the adapter. Likewise, the control unit 16 may be used without change, or can be quickly modified to fulfill the requirements of any emergency equipment, all without severing of wiring and alteration of connectors.

I claim:

1. A multiple-function control device for controlling various communications and other emergency equipment in motor driven vehicles, comprising:
    a. a portable housing having a top, spaced-apart sidewalls, a partial bottom wall adjacent the rear end of the housing, and longitudinally extending side flanges on the bottom of the sidewalls, the front and rear ends of the housing being open;
    b. a control unit having a bottom shorter than the length of the housing, a rear end wall, a front end panel, and manually actuated multiple function control means on the front endpanel surface exposed to the driver of the vehicle in which the housing is mounted, said control unit bottom being slidable in the housing on said side flanges;
    c. a multiple connector on the control unit rear end wall;
    d. electrical wiring in the control unit between the front end panel control means and the multiple connector;
    e. a separate adapter unit having inner and outer end plates connected together in spaced-apart relationship slidably supported on the said partial bottom wall adjacent the rear end of the housing;
    f. a multiple connector on the adapter unit inner end plate separably engaging the connector on the control unit; and g. a plurality of sockets on the outer end plate of the adapter unit for detachably receiving plug-in means on the various emergency equipment in the vehicle, whereby alterations, substitutions and replacements of the emergency equipment is permitted by quick plug-in connection through the adapter unit to the control unit.

2. The control device defined by claim 1, in which the control unit is inserted by sliding movement into the housing through the forward open end, into contact with the inner edge of said partial bottom of the housing, and the adapter unit is inserted into the housing through the rearward open end, with its sockets exposed at said end.

3. The control device defined by claim 1, in which the multiple connectors on the control unit and on the adapter unit are of the rack-to-panel type separable by movement of one of the units away from the other longitudinally of the housing.

4. The control device defined by claim 1, in which the multiple connectors on the control unit and on the adapter unit are of the rack-to-panel type and one of said connectors is loosely mounted to permit limited movement relatively to its support for self-adjustment to the cooperating connector.

5. The control device defined by claim 1, in which the manually actuated control means on the front end panel comprise a plurality of frequency selection switch buttons, communication control switches, and multifunction rotating knobs mounted on the panel for quick access to the driver of the vehicle.

6. The control device defined by claim 1, in which the control unit and the adapter unit are quickly separately removable from the housing by sliding movement in opposite directions through said opposite open ends in housing.

7. The control device defined by claim 1, in which the control unit, adapter unit, wiring between the front panel control means and connector on the control unit, and wiring between the adapter connector and the sockets on the outer end plate of the adapter are located within and concealed by the housing.